United States Patent [19]

Weinberg

[11] Patent Number: 5,234,471
[45] Date of Patent: Aug. 10, 1993

[54] POLYIMIDE GAS SEPARATION MEMBRANES FOR CARBON DIOXIDE ENRICHMENT

[75] Inventor: Mark G. Weinberg, Wilmington, Del.

[73] Assignees: E. I. du Pont de Nemours and Company, Wilmington, Del.; L'Air Liquide S.A., Paris, France

[21] Appl. No.: 830,882

[22] Filed: Feb. 4, 1992

[51] Int. Cl.$^5$ ............................................. B01D 53/22
[52] U.S. Cl. ................................... 95/47; 95/51; 95/52; 95/49
[58] Field of Search .................. 55/16, 68, 158, 27, 55/70, 73

[56] References Cited

U.S. PATENT DOCUMENTS

| | | | |
|---|---|---|---|
| 3,822,202 | 7/1974 | Hoehn | 210/23 |
| 3,899,309 | 8/1975 | Hoehn et al. | 29/16 |
| 4,080,743 | 3/1978 | Manos | 34/9 |
| 4,080,744 | 3/1978 | Manos | 34/9 |
| 4,113,628 | 9/1978 | Alegranti | 210/500 |
| 4,120,098 | 10/1978 | Manos | 34/9 |
| 4,230,463 | 10/1980 | Henis et al. | 55/16 |
| 4,659,343 | 4/1987 | Kelly | 55/16 |
| 4,690,873 | 9/1987 | Makino et al. | 428/473.5 |
| 4,705,540 | 11/1987 | Hayes | 55/16 |
| 4,717,394 | 1/1988 | Hayes | 55/16 |
| 4,830,640 | 5/1989 | Nakamura et al. | 55/16 X |
| 4,838,900 | 6/1989 | Hayes | 55/16 |
| 4,880,442 | 11/1989 | Hayes | 55/16 |
| 4,897,092 | 1/1990 | Burgoyne, Jr. et al. | 55/16 |
| 4,929,405 | 5/1990 | Kohn | 55/16 X |
| 4,932,982 | 6/1990 | Hayes | 55/16 |
| 4,932,983 | 6/1990 | Hayes | 55/16 |
| 4,948,400 | 8/1990 | Yamada et al. | 55/16 X |
| 4,983,191 | 1/1991 | Ekiner et al. | 55/158 |
| 4,990,168 | 2/1991 | Sauer et al. | 62/24 |
| 5,015,270 | 5/1991 | Ekiner et al. | 55/16 |
| 5,034,024 | 7/1991 | Hayes | 55/16 |
| 5,042,992 | 8/1991 | Blinka et al. | 55/16 |
| 5,055,116 | 10/1991 | Kohn et al. | 55/16 |
| 5,061,298 | 10/1991 | Burgoyne, Jr. et al. | 55/16 |
| 5,071,452 | 12/1991 | Avrillon et al. | 55/16 |
| 5,074,891 | 12/1991 | Kohn et al. | 55/16 |
| 5,076,816 | 12/1991 | Avrillon et al. | 55/16 |
| 5,086,623 | 2/1992 | Gauthier | 55/16 X |
| 5,112,941 | 5/1992 | Kasai et al. | 55/16 X |

FOREIGN PATENT DOCUMENTS 0219878 4/1987 European Pat. Off.

OTHER PUBLICATIONS

The Polymer Handbook (Brandrup and Immergut editors) 1975, pp. III-229 thru III-239, "Permeability Coefficients".

Gas Sorption and Permeation in a Series of Aromatic Polyimides (T. Kim, The U. of Texas at Austin Apr. 1988), pp. 28-30, 105-114.

*Primary Examiner*—Robert Spitzer

[57] ABSTRACT

Aromatic polyimide membranes have superior flux at low temperature for carbon dioxide and other condensable gases. Superior flux is achieved without reduction in selectivity or other valuable properties of prior art membranes.

4 Claims, No Drawings

POLYIMIDE GAS SEPARATION MEMBRANES FOR CARBON DIOXIDE ENRICHMENT

FIELD OF THE INVENTION

The present invention relates to certain substituted aromatic polyimide separation membranes particularly useful for separating carbon dioxide and the process of using them. In particular, the inventive membranes show surprisingly high flux for condensable gases such as carbon dioxide at low temperatures.

BACKGROUND OF THE INVENTION

The prior art discloses a wide variety of aromatic polyimide gas separation membranes which have high gas permeation rates. Among the prior art membranes are gas separation membranes made from a microporous and aromatic polyimide gas separation membrane in which the molecular structure is such that the molecules in the polymer can pack densely.

U.S. Pat. No. 4,717,394 discloses a broad class of aromatic polyimide gas separation membranes in which the monomeric diamines are rigid and substituted on essentially all of the positions ortho to the amino substituents and the monomeric acid anhydride groups are essentially all attached to rigid aromatic moieties. These polymers exhibit extremely high permeation rates to gases. U.S. Pat. No. 4,717,394 also teaches an aromatic polyimide gas separation membrane in which some of the before-described rigidity is relaxed through use of acid anhydride groups which are essentially attached to less rigid aromatic moieties, structurally less rigid aromatic diamines, and/or unsubstituted diamines. Through controlled reduction of the rigidity, polyimide gas separation membranes have improved selectivities to gases while still maintaining high permeation rates.

Such prior art membranes provide greater selectivity for the permeation of certain gases from multicomponent gas mixtures through the membranes. At comparable gas selectivities, membranes of the polyimides disclosed herein have generally high gas permeation rates than other polymers disclosed in the prior art. Such membranes do not, however, generally achieve high flux rates for condensable gases, particularly carbon dioxide, at low temperatures, while still maintaining good selectivity. The Polymer Handbook (Brandrup and Immergut editors) lists the activation energy of permeation for numerous polymers. The activation energy of permeation describes the temperature dependence of permeation. In particular, a positive activation energy indicates that the permeability increases with temperature. For all polymers listed, the activation energy of permeation is positive for carbon dioxide.

A dissertation entitled Gas Sorption and Permeation in a Series of Aromatic Polyimides (T. Kim, The University of Texas at Austin, 1988) reports the permeabilities of carbon dioxide and other gases for various polyimide membranes which are similar in structure to the invention membranes, at different temperatures. In particular, tables 15 and 17 of the dissertation report pure gas permeabilities of carbon dioxide and other gases for polyimide polymers made from (i) diaminofluorene (DAF) and hexafluoro isopropylidene bis (phthalic anhydride) ("6FDA") and (ii) isorpopylidenedianiline (IPDA) and 6FDA, as follows:

|  | Temperature (°C.) | | |
|---|---|---|---|
|  | 35 | 45 | 55 |
| DAF-6FDA | | | |
| $CO_2$ Permeability (centiBarrers) | 1950 | 2020 | 2130 |
| $N_2$ Permeability (centiBarrers) | 81.3 | 95.4 | 115 |
| $CO_2/N_2$ Selectivity | 24.0 | 21.2 | 18.5 |
| $CH_4$ Permeability (centiBarrers) | 35.5 | 46.0 | 57.0 |
| $CO_2/CH_4$ Selectivity | 54.9 | 43.9 | 37.4 |
| IPDA-6FDA | | | |
| $CO_2$ Permeability (centiBarrers) | 2430 | 2560 | 2740 |
| $N_2$ Permeability (centiBarrers) | 87.2 | 109 | 139 |
| $CO_2/N_2$ Selectivity | 27.9 | 23.5 | 19.7 |
| $CH_4$ Permeability (centiBarrers) | 49.4 | 66.0 | 88.4 |
| $CO_2/CH_4$ Selectivity | 49.2 | 38.8 | 31.0 |

The permeability of carbon dioxide follows the well-established trend—productivity decreases with decreasing temperature.

Polymer membranes made from 2,4,6-trimethyl-3,3-phenylenediamine ("DAM") and 6FDA are known to show increased flux for carbon dioxide at low temperatures; however, in the vast majority of other cases, the polymers do not show such a temperature dependence and temperature must be carefully adjusted, usually increased, to achieve the desired flux rates and selectivities for each particular gas separation.

The present invention provides an aromatic polyimide membrane for the separation of condensable gases such as carbon dioxide, water, ammonia or hydrogen sulfide, particularly carbon dioxide, for other gases. The inventive membrane achieves high flux rates with good selectivity at low temperatures, a phenomenon heretofore unknown for this class of polyimide membranes.

DETAILED DESCRIPTION OF THE INVENTION

The present invention relates to the discovery that certain aromatic polyimides exhibit exceptional flux rates and good selectivity for the enrichment of carbon dioxide and other condensable gases at low temperatures.

Typically, at low temperatures an aromatic polyimide gas separation membrane exhibits increased selectivity and decreased flux for the separation of carbon dioxide. However, the present membrane achieves increased flux, along with increased selectivity for carbon dioxide at lower temperatures. Operation at low temperatures may avoid the necessity for costly heating equipment and temperature controls, as well as achieving an energy savings.

The particular membrane which exhibits this phenomenon is made from an aromatic polyimide with the following repeating formula:

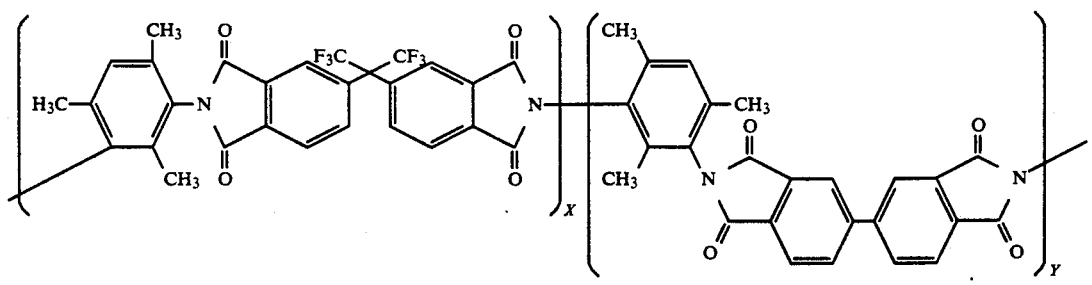

where
X is 50%–80% and
Y is 100%–X.

The precise mechanism for achieving high flux rates for condensable gases such as carbon dioxide at low temperatures is not known; however, it is believed that the properties arise from the solubility of carbon dioxide molecules vis-a-vis the membrane. In particular, carbon dioxide is a condensable gas which appears to become more soluble than other noncondensable gases in the membrane at low temperatures. Increased solubility facilitates transport of carbon dioxide molecules through the membrane. Even though the diffusivity for gases decreases at low temperatures, for this membrane it is believed that the solubility of carbon dioxide increases sufficiently to overcome reductions in transport due to decreased diffusivity.

It is not apparent to one skilled in the art whether a particular membrane will exhibit the phenomenon of increased flux for a particular gas at low temperatures. The unique properties of the present membrane appear to arise from the packing and the molecular free volume in the polymer structure, which are not predictable.

These soluble polyimides can be solution cast on porous solvent resistant substrates to serve as the dense separating layer of a composite membrane; or they can be solution cast as dense or asymmetric films.

The polyimides described in this invention also have high inherent thermal stabilities. They are generally stable to 400° C. in air or inert atmospheres. The glass transition temperatures of these polyimides are generally above 300° C. The high temperature characteristics of these polyimides can help to prevent the membrane compaction problems observed in other polymers at even moderate temperatures.

The term "membrane" as used herein is intended to encompass a wide variety of possible configurations known in the prior art. For example, the membrane may be used as a flat film, tubular film or hollow fiber. A hollow fiber membrane is generally preferred and can be readily prepared and operated by techniques known in the art.

The present invention finds use in recovery of carbon dioxide or other condensable gases such as water, ammonia or hydrogen sulfide from oxygen, nitrogen, methane or other hydrocarbons.

EXAMPLES

Comparative Example 1

Dimethyacetamide (350 ml) was added to 6FDA (88.9 g, 0.20 mol) and 1.5-naphthalene diamine (31.6 g 0.20 mol) at 50° C. in an inert atmosphere while stirring. After stirring at 50° C. for 2 hours, a mixture of acetic anhydride (75.8 ml, 0.80 mol) and triethyl amine (112.94 ml, 0.81 mol) was added and the reaction allowed to stir for an additional 2 hours at 50° C. under an inert atmosphere. The viscous reaction solution was precipitated in methanol, and the solid was filtered and dried in a vacuum oven overnight at room temperature, at 150° C. for 1 hour, and 220° C. for 4 hours. This gave 111.2 g of polyimide.

Films of the above polymer were cast from a 15 wt. % solution in N-methyl pyrrolidone onto a glass plate treated with Du Pont Teflon ® dry lubricant at 100° C. with a 15 ml ($3.8 \times 10^{-4}$ m) knife gap. The films were dried on the plate at 100° C. for 15 minutes, cooled, stripped off the plate and dried at 100° C. overnight in a vacuum oven.

The films prepared above were extracted in methanol: water (50:50) for 3 days, and twice in methanol for 3 hours each. These films were dried in a vacuum oven overnight at room temperature and at 100° C. in a vacuum oven for 24 hours.

The extracted films prepared above were tested for mixed gas $CO_2/CH_4$ (50/50 mol) permeabilities at 400 psig (2.76 MPa) and 35° C. Readings were taken after 24 hours. The temperature was increased to 90° C. Readings were taken after an additional 24 hours. The results are given below:

|  | Temperature (°C.) | |
| --- | --- | --- |
|  | 35 | 90 |
| $CO_2$ Permeability (centiBarrer) | 5149 | 6122 |
| $CH_4$ Permeability (centiBarrer) | 126.8 | 314.4 |
| $CO_2/CH_4$ Selectivity | 40.6 | 19.5 |

A centiBarrer is the number of cubic centimeters of gas passed by the membrane at standard temperature and pressure times the thickness of the membrane in centimeters, times $10^{-12}$, divided by the permeating area of the membrane in square centimeters, times the time in seconds times the partial pressure difference across the membrane in centimeters of mercury, i.e., $$\text{centiBarrer} = 10^{-12} \frac{cm^3 \ (STP) - cm}{cm^2 - \sec - cm \ Hg}$$

The Comparative Example demonstrates the typical relationship between temperature and productivity. In particular, for this polyimide film, the permeability for $CO_2$ decreases at lower temperatures.

Example 1

In this example, asymmetric hollow fibers were spun from a hollow fiber spinnerette into a water coagulant as has been taught in the prior art. For example, the hollow fiber may be of the type described in U.S. Pat. No. 4,230,463.

The polyimide was prepared by reacting DAM with equi-molar quantities of 6FDA and 3,3',4,4'-biphenyl tetracarboxylic acid dianhydride ("BPDA") in dimethyl sulfoxide according to the teachings of U.S. Pat. No. 4,983,191. In particular, to a dry 50-gallon glass-lined stainless steel reactor under nitrogen with mechanical stirring was charged dimethylsulfoxide ("DMSO") (66.12 kg). Next was added DAM (6.99 kg. 46.50 moles), which was rinshed in with DMSO (8.27 kg). Next was added 6FDA (10.42 kg, 23.46 moles) and then BPDA (6.90 kg, 23.46 moles), which was rinsed in with DMSO (8.27 kg). The mixture was stirred for 3 hours and then, in rapid succession, acetic anhydride (18.99 kg, 186 moles) and triethylamine (18.82 kg, 186 moles) were mixed in. The mixture was stirred overnight.

Approximately one-quarter of the polymer solution was precipitated in a 100-gallon tank filled with methanol under mechanical agitation. This was repeated until the entire batch was precipitated. The resulting flake was filtered, then rewashed in methanol twice. The flake was air dried and dried in a rotary dryer for 4 hours once the internal oven temperature reached 220° C. to yield 22.2 kg of off-white flake; ninh=0.86 (DNAc/4% LiCl).

A polymer solution was prepared from 22 wt. % of the polymer 20 wt. % based-on-polymer para-chlorophenyl sulfone, and 6 wt. % based-on-polymer acetic anhydride in 1:1 dimethyl acetamide: dimethyl sulfoxide.

The above polymer solution was extruded through a hollow fiber spinerette with fiber channel dimensions of outer diameter equal to 22 mils (559 microns) and inner diameter equal to 10 mils (254 microns) at a rate of 140 cc per hour at 70° C. to 100° C. A solution of 85 volume % 1:1 (volume) dimethyl acetamide: dimethyl sulfoxide in water was injected into the fiber bore at 57 cc per hour. The spun fiber was passed through a room temperature air gap of 1 to 10 cm into a water coagulant bath maintained at 22° C. The fiber was wound up at 50 meters per minute.

The water-wet fiber was dehydrated as taught in U.S. Pat. Nos. 4,080,743; 4,080,744; 4,120,098 and EPO Publication No. 219,878. This specifically involved the sequential replacement of water with methanol, the replacement of methanol with hexane, and hot-air drying. The dry fibers were cut into lengths of approximately 8 inches (0.20 m) long and the open end of the fibers were potted in an epoxy resin within a ¼ inch (0.00635 in) diameter stainless steel tube. Twenty-four fibers were so potted for individual tests.

Asymmetric hollow fibers, prepared as described above, were tested for mixed gas $CO_2/N_2$ permeabilities at 100 psig (689 KPa) and 200 psig (1378 KPa). The feed composition was held constant at 72:28 mole ratio $CO_2/N_2$. The results are given below:

|  | Temperature (°C.) | |
|---|---|---|
|  | −20 | 50 |
| Feed Pressure = 100 psig | | |
| $CO_2$ Permeability (GPU) | 952 | 761 |
| $N_2$ Permeability (GPU) | 24.8 | 77.7 |
| $CO_2/N_2$ Selectivity | 38.4 | 9.8 |
| Feed Pressure = 200 psig | | |

|  | Temperature (°C.) | |
|---|---|---|
|  | −20 | 50 |
| $CO_2$ Permeability (GPU) | 1160 | 659 |
| $N_2$ Permeability (GPU) | 42.3 | 73.2 |
| $CO_2/N_2$ Selectivity | 27.4 | 9.0 |

The unit GPU, or Gas Permeation Unit, is defined as the number of cubic centimeters of gas passed by the membrane at standard temperature and pressure times $10^{-6}$ divided by the permeating area of the membrane in square centimeters times the time in seconds times the partial pressure differences across the membrane in cmHg, i.e., $$GPU = 10^{-6} \times \frac{cm^3 \ (STP)}{cm^2 - sec - cm \ Hg}$$

This Example demonstrates the surprising phenomenon that for the inventive membrane permeability for carbon dioxide from the gas mixture increases at low temperatures while the nitrogen permeability increases as expected. Consequently, the selectivity for carbon dioxide increase dramatically at low temperatures.

Example 2

Asymmetric hollow fibers spun using the polymer and procedures of Example 1 were tested sequentially with pure gas $N_2$ and $CO_2$, respectively, at 65 psig (448 KPa). The results are given below:

|  | Temperature (°C.) | | |
|---|---|---|---|
|  | −22 | 10 | 50 |
| $CO_2$ Permeability (GPU) | 2320 | 1471 | 914 |
| $N_2$ Permeability (GPU) | 34.9 | 44.9 | 53.4 |
| $CO_2/N_2$ Selectivity | 66.6 | 32.8 | 17.1 |

This example demonstrates the surprising phenomenon that for the inventive membrane permeability of pure carbon dioxide increases at low temperature while the nitrogen permeability decreases as expected.

Example 3

Asymmetric hollow fibers were spun with the polymer and procedures of Examples 1 and 2. However, the polymer spinning solution consisted of 22 wt. % based-on-polymer tetramethylene sulfone, 10 wt. % based-on-polymer lithium nitrate and 6 wt. % based on polymer acetic anhydride in 1:1 dimethyl acetamide:dimethyl sulfoxide. The bore fluid compositions and flow rates were identical.

The dry fibers were prepared as in Examples 1 and 2 and tested sequentially with pure gas $N_2$ and $CO_2$ at 85 psig (586 KPa). The results are given below:

|  | Temperature (°C.) | | | |
|---|---|---|---|---|
|  | −21 | −1.4 | 19 | 49 |
| $CO_2$ Permeability (GPU) | 1007 | 465 | 310 | 302 |
| $N_2$ Permeability (GPU) | 7.0 | 9.0 | 9.6 | 15.6 |
| $CO_2/N_2$ Selevtivity | 144 | 51.7 | 32.3 | 19.4 |

This example demonstrates the surprising phenomenon that for the inventive membrane permeability of pure carbon dioxide increases at low temperature while the nitrogen permeability decreases as expected.

What is claimed is:

1. A process for separating a condensable gas from a mixture of gases comprising bringing said mixture of gases into contact with one side of a gas separation membrane formed of an aromatic polyimide comprising the units of the formula

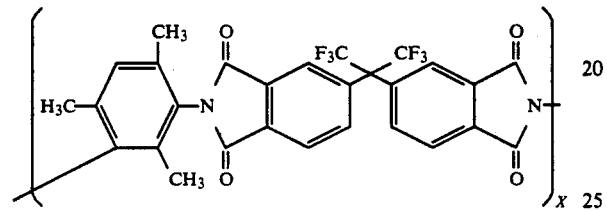

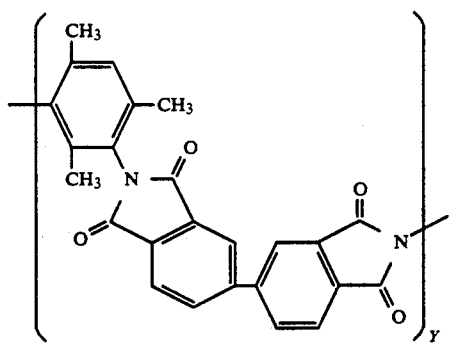

where X is 50%–80% and Y is 100%-X, at a temperature below about 25° C.

2. A process of claim 1 wherein said condensable gases are selected from the group comprising carbon dioxide, water, ammonia, and hydrogen sulfide.

3. A process of claim 2 wherein said condensable gas is carbon dioxide.

4. A process of claim 1 wherein the permeability and selectivity of a condensable gas increases as temperature decreases.

* * * * *